US 12,427,830 B2

(12) United States Patent
Jeong et al.

(10) Patent No.: US 12,427,830 B2
(45) Date of Patent: Sep. 30, 2025

(54) HEAT PUMP SYSTEM FOR A VEHICLE (71) Applicants: HYUNDAI MOTOR COMPANY, Seoul (KR); KIA CORPORATION, Seoul (KR); HANON SYSTEMS, Daejeon (KR)

(72) Inventors: Hoyoung Jeong, Hwaseong-si (KR); Hochan An, Hwaseong-si (KR); Yeonho Kim, Seoul (KR); Jeawan Kim, Hwaseong-si (KR); Man Hee Park, Suwon-si (KR); Jae Yeon Kim, Hwaseong-si (KR); Yeong Jun Kim, Incheon (KR); Hae Jun Lee, Daejeon (KR); Seong Hun Kim, Daejeon (KR); Beom Seok Joo, Daejeon (KR); Yun Jin Kim, Daejeon (KR)

(73) Assignees: HYUNDAI MOTOR COMPANY, Seoul (KR); KIA CORPORATION, Seoul (KR); HANON SYSTEMS, Daejeon (KR)

( * ) Notice: Subject to any disclaimer, the term of this patent is extended or adjusted under 35 U.S.C. 154(b) by 131 days.

(21) Appl. No.: 18/541,081

(22) Filed: Dec. 15, 2023

(65) Prior Publication Data

US 2025/0074139 A1 Mar. 6, 2025

(30) Foreign Application Priority Data

Aug. 29, 2023 (KR) .................. 10-2023-0113273

(51) Int. Cl.
*B60H 1/00* (2006.01)
*B60H 1/22* (2006.01)

(52) U.S. Cl.
CPC ..... *B60H 1/00485* (2013.01); *B60H 1/00885* (2013.01); *B60H 2001/00121* (2013.01); *B60H 2001/2271* (2013.01)

(58) Field of Classification Search
CPC ............ B60H 1/00485; B60H 1/00885; B60H 2001/00121; B60H 2001/2271
See application file for complete search history.

(56) References Cited

U.S. PATENT DOCUMENTS

2022/0212517 A1\* 7/2022 Yu ...................... B60H 1/00392
2022/0355648 A1\* 11/2022 Kim ...................... B60H 1/143

\* cited by examiner

*Primary Examiner* — Nael N Babaa
(74) *Attorney, Agent, or Firm* — Lempia Summerfield Katz LLC (57) ABSTRACT

A heat pump system for a vehicle is configured to perform cooling or heating of the vehicle interior by using a natural refrigerant, and efficiently adjust the temperature of the battery module by using a single chiller that heat-exchanges refrigerant and coolant.

22 Claims, 6 Drawing Sheets

HEAT PUMP SYSTEM FOR A VEHICLE

CROSS-REFERENCE TO RELATED APPLICATION

This application claims priority to and the benefit of Korean Patent Application No. 10-2023-0113273 filed on Aug. 29, 2023, the entire contents of which are incorporated herein by reference.

BACKGROUND

(a) Field

The present disclosure relates to a heat pump system for a vehicle. More particularly, the present disclosure relates to a heat pump system for a vehicle capable of performing cooling or heating of a vehicle interior.

(b) Description of the Related Art

Generally, an air conditioning system for a vehicle includes an air conditioner unit circulating a refrigerant in order to heat or cool an interior of the vehicle.

The air conditioner unit is used to maintain the interior of the vehicle at an appropriate temperature regardless of a change in an external temperature. The air conditioner unit is configured to heat or cool the interior of the vehicle. This is achieved by exchanging heat using a condenser and an evaporator in a process in which a refrigerant discharged by driving a compressor is circulated back to the compressor through the condenser, a receiver drier, an expansion valve, and the evaporator.

In other words, the air conditioner unit lowers the temperature and humidity of the interior of the vehicle by condensing a high-temperature high-pressure gas-phase refrigerant compressed from the compressor by the condenser, passing the refrigerant through the receiver drier and the expansion valve, and then evaporating the refrigerant in the evaporator in a cooling mode.

The development of an environment-friendly technology for a vehicle may be a core technology in the future of the automobile industry. Advanced car makers have focused their energy on the development of an environmentally-friendly vehicle to achieve environmental and fuel efficiency regulations.

Recently, in accordance with the continuous increase in interest in energy efficiency and environmental pollution problems, the development of an environmentally-friendly vehicle capable of substantially substituting for an internal combustion engine vehicle is required. The environmentally-friendly vehicle is classified into an electric vehicle driven using a fuel cell or electricity as a power source and a hybrid vehicle driven using an engine and a battery.

Currently, the electric vehicle is in the spotlight as a means of transportation in the future to solve environmental problems and energy resource problems.

A heat pump system, which is an air conditioner apparatus for regulating the temperature of the vehicle interior, is applied to such an electric vehicle.

However, the refrigerant that is conventionally used in the heat pump system contains a large amount of environmentally regulated material, e.g., PFAS (Per- and Polyfluoroalkyl Substances).

The above information disclosed in this Background section is provided only to enhance understanding of the background of the disclosure. Therefore, the Background section may contain information that does not form the prior art that is already known to a person of ordinary skill in the art.

SUMMARY

The present disclosure provides a heat pump system for a vehicle capable of performing cooling or heating of a vehicle interior by using natural refrigerant. Additionally, the present disclosure provides a heat pump system for a vehicle capable of efficiently adjusting the temperature of a battery module by using a single chiller where refrigerant and coolant exchange heat to comply with environmental regulations.

In addition, the heat pump system may be capable of maximizing cooling and heating performance by operating in a super-critical cycle that is a state in which the pressure and temperature of the refrigerant are higher than a threshold pressure and temperature by applying an R744 refrigerant. The R744 refrigerant is a natural refrigerant using carbon dioxide.

In one embodiment of the present disclosure, a heat pump system for a vehicle may include: an air conditioner unit including a compressor, a second heat-exchanger, a third heat-exchanger, and a fourth heat-exchanger that are connected through a refrigerant line so as to circulate refrigerant through a refrigerant line. The heat pump system may also include a chiller connected to the refrigerant line through a second connection line, and configured to exchange heat between the refrigerant supplied from the air conditioner unit and a coolant to adjust a temperature of the coolant. The air conditioner unit may further include: a first control apparatus provided in the refrigerant line downstream of the compressor; and a first heat-exchanger connected to the first control apparatus through a first connection line. The air conditioner unit may also include: a second control apparatus provided at a position where the refrigerant line and the second connection line are connected upstream of the chiller and the fourth heat-exchanger; a third control apparatus provided in the refrigerant line between the fourth heat-exchanger and the compressor; and a third connection line having a first end connected to the refrigerant line between the fourth heat-exchanger and the third control apparatus and a second end connected to the refrigerant line between the third heat-exchanger and the second control apparatus. The air conditioner unit may also include a fourth control apparatus provided in the third connection line.

The first control apparatus may include a first valve provided in the refrigerant line between the compressor and the second heat-exchanger, and a second valve provided in the first connection line between the compressor and the first heat-exchanger.

The first valve and the second valve may be 2-way valves.

The first control apparatus may include a single control valve provided in a portion where the refrigerant line and the first connection line are connected.

The second control apparatus may include a first expansion valve provided in the refrigerant line upstream of the fourth heat-exchanger. The second control apparatus may also include a second expansion valve provided in the second connection line upstream of the chiller.

The air conditioner unit may further include a branch line having a first end connected to the refrigerant line between the first control apparatus and the second heat-exchanger and a second end connected to the third connection line. The air conditioner unit may also include: a fifth control apparatus provided in the branch line; and a fourth connection line having a first end connected to the refrigerant line between the second heat-exchanger and the third heat-exchanger and a second end connected to the refrigerant line between the third control apparatus and the compressor. The air conditioner unit may also include a sixth control apparatus provided in the fourth connection line, and a seventh control apparatus provided in the first connection line.

The third control apparatus and the sixth control apparatus may be 2-way valves.

The fourth control apparatus, the fifth control apparatus, and the seventh control apparatus are expansion valves.

In a cooling mode of the vehicle interior, the refrigerant line connecting the fourth heat-exchanger and the compressor may be opened by an operation of the third control apparatus. The refrigerant line connecting the compressor and the second heat-exchanger may be opened by an operation of the first control apparatus. The first connection line may be closed by the operation of the first control apparatus and the seventh control apparatus. The third connection line may be closed by an operation of the fourth control apparatus. The branch line may be closed by an operation of the fifth control apparatus. Additionally, the fourth connection line may be closed by an operation of the sixth control apparatus.

In the cooling mode of the vehicle interior, when cooling of a battery module is required, the second connection line may be opened by an operation of the second control apparatus.

The second control apparatus may be configured to expand the refrigerant introduced into the second connection line and flow the expanded refrigerant to the chiller such that the battery module may be cooled by using the coolant to exchange heat with the refrigerant in the chiller.

In a heating mode of the vehicle interior, the refrigerant line connecting the third heat-exchanger and the fourth heat-exchanger may be closed by an operation of the second control apparatus. A portion of the refrigerant line connecting the compressor and the third control apparatus may be closed by an operation of the third control apparatus. A portion of the refrigerant line connecting the first control apparatus and the second heat-exchanger may be closed by an operation of the first control apparatus. The first connection line may be opened by the operation of the first control apparatus. The first connection line is connected to the refrigerant line upstream of the fourth heat-exchanger by an operation of the seventh control apparatus. The second connection line may be closed by the operation of the second control apparatus. The third connection line may be opened by an operation of the fourth control apparatus. The branch line may be opened by an operation of the fifth control apparatus, and the fourth connection line may be opened by an operation of the sixth control apparatus.

In another embodiment, the fourth control apparatus may be configured to expand the refrigerant such that the expanded refrigerant may be supplied to the third heat-exchanger. The fifth control apparatus may be configured to expand the refrigerant such that the expanded refrigerant may be supplied to the second heat-exchanger.

A portion of the refrigerant among the refrigerant introduced from the fourth heat-exchanger into the third connection line may be introduced into the second heat-exchanger through the branch line. A remaining refrigerant may be introduced into the third heat-exchanger.

The refrigerant discharged from the second heat-exchanger and the third heat-exchanger may be supplied to the compressor along the fourth connection line.

The seventh control apparatus may be configured to supply the refrigerant introduced through the first connection line to the fourth heat-exchanger in an unexpanded state.

In the heating mode of the vehicle interior, when dehumidification is required, the seventh control apparatus may be configured to expand the refrigerant introduced through the first connection line and supply the expanded refrigerant to the fourth heat-exchanger.

The second heat-exchanger, the third heat-exchanger, and the fourth heat-exchanger may be configured to cool or evaporate the refrigerant according to selective operations of the second control apparatus, the fourth control apparatus, the fifth control apparatus, and the seventh control apparatus each.

The refrigerant may be R744 refrigerant formed of carbon dioxide.

An accumulator may be provided in the refrigerant line, between the fourth heat-exchanger and the compressor.

The second heat-exchanger may be connected to an electrical component through a first line through which the coolant circulates, and the chiller may be connected to a battery module through a second line through which the coolant circulates.

The first heat-exchanger, the third heat-exchanger, and the fourth heat-exchanger may be air-cooled gas coolers configured to exchange heat between the refrigerant with air. The second heat-exchanger and the chiller may be water-cooled gas coolers configured to exchange heat between the refrigerant and the coolant.

As described above, by employing a heat pump system for a vehicle according to an embodiment, as cooling or heating of the vehicle interior is performed by using the natural refrigerant, it is possible to cope with environmental regulations and improve the overall marketability of the vehicle.

In addition, according to the disclosure, by applying the R744 refrigerant, that is a natural refrigerant using carbon dioxide, cooling and heating performance may be maximized by being operated in a super-critical region. The super-critical region is a state in which the pressure and temperature of the refrigerant are higher than the threshold pressure and temperature, for cooling and heating of the vehicle interior.

In addition, according to the disclosure, streamlining and simplification of the system may be achieved by efficiently adjusting the temperature of the battery module by using the single chiller that heat-exchanges the coolant and the refrigerant according to the mode of the vehicle.

In addition, according to an embodiment, by efficiently adjusting the temperature of the battery module, the optimal performance of the battery module may be enabled, and the overall travel distance of the vehicle may be increased due to the efficient management of the battery module.

In addition, in the heating mode of the vehicle interior, according to the disclosure, since the refrigerant is branched and expanded to be supplied to each heat-exchanger, it becomes easy to control the flow of the refrigerant, smoothly recollect the ambient air heat and the waste heat of the electrical components, and at the same time, optimally design a chiller for cooling the battery module.

In addition, according to an embodiment, it is possible to reduce manufacturing cost and weight through simplification of an entire system, and to improve space utilization.

BRIEF DESCRIPTION OF THE DRAWINGS

These drawings are for reference only in describing embodiments of the present disclosure. Therefore, the technical idea of the present disclosure should not be limited to the accompanying drawings.

DETAILED DESCRIPTION

Embodiments of the present disclosure are hereinafter described in detail with reference to the accompanying drawings.

Embodiments disclosed in the present disclosure and the constructions depicted in the drawings are only some of the embodiments of the present disclosure, and do not cover the entire scope of the present disclosure. Therefore, it should be understood that there may be various equivalents and variations at the time of the application of this specification.

In order to clarify the present disclosure, parts that are not related to the description have been omitted, and the same elements or equivalents have been referred to with the same reference numerals throughout the specification.

Also, the size and thickness of each element are arbitrarily shown in the drawings, but the present disclosure is not necessarily limited thereto. Additionally, in the drawings, the thickness of layers, films, panels, regions, and the like, are exaggerated for clarity.

In addition, unless explicitly described to the contrary, the word "comprise" and variations such as "comprises" or "comprising," should be understood to imply the inclusion of stated elements but not the exclusion of any other elements.

Furthermore, each of the terms, such as " . . . unit," " . . . means," " . . . portions," " . . . part," and " . . . member" described in the specification, mean a unit of a comprehensive element that performs at least one function or operation.

When a component, device, element, or the like of the present disclosure is described as having a purpose or performing an operation, function, or the like, the component, device, or element should be considered herein as being "configured to" meet that purpose or perform that operation or function.

Figure 1:
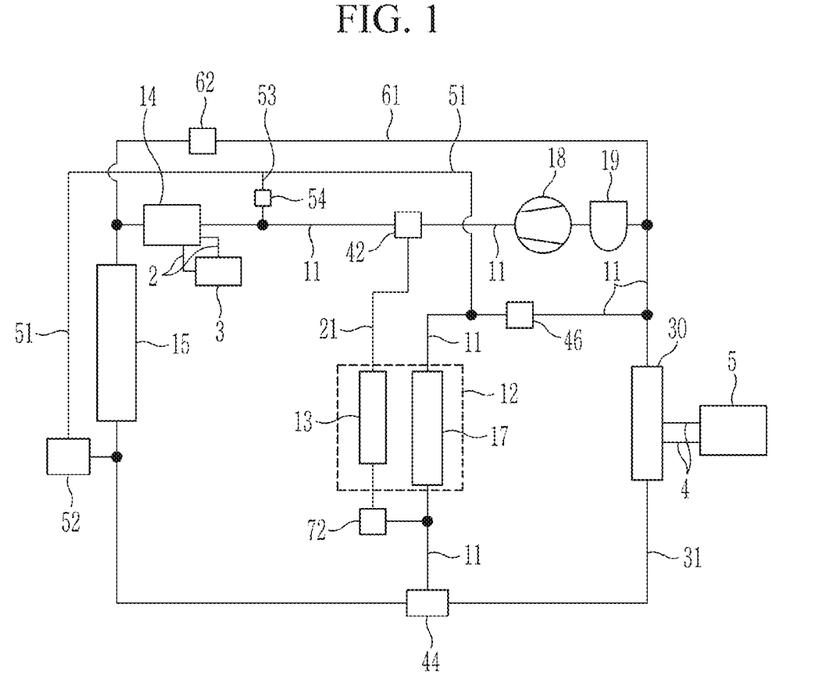
FIG. 1 is a block diagram of a heat pump system for a vehicle according to an embodiment.
Figure 2:
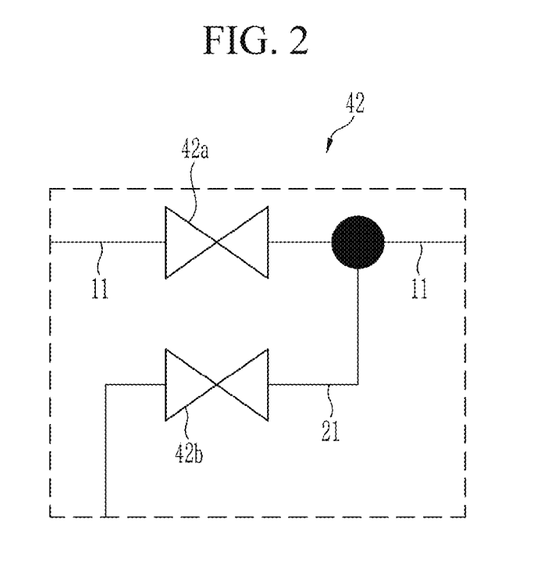
FIG. 2 is a schematic diagram of a first control apparatus of a heat pump system for a vehicle according to an embodiment.
Figure 3:
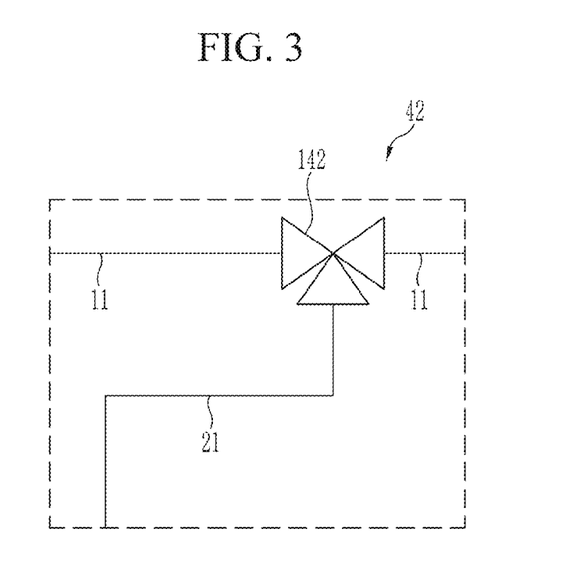
FIG. 3 is a schematic diagram of another embodiment of a first control apparatus of a heat pump system for a vehicle according to an embodiment.
Figure 4:
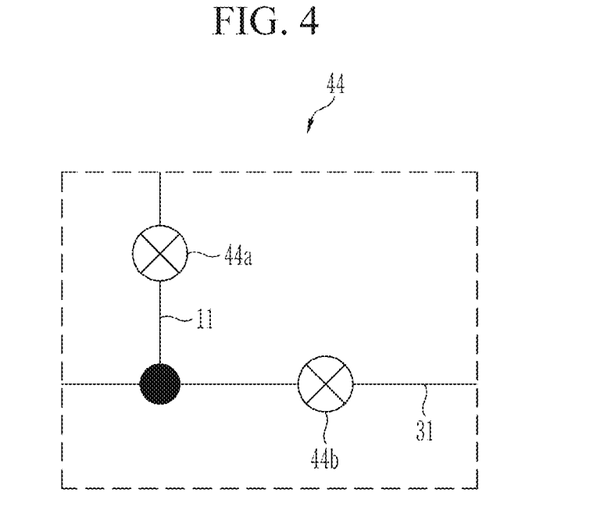
FIG. 4 is a schematic diagram of a second control apparatus of a heat pump system for a vehicle according to an embodiment.

FIG. 1 is a block diagram illustrating a heat pump system for a vehicle according to an embodiment. FIG. 2 is a schematic diagram of a first control apparatus of a heat pump system for a vehicle according to an embodiment. FIG. 3 is a schematic diagram of another embodiment of a first control apparatus of a heat pump system for a vehicle according to an embodiment. FIG. 4 is a schematic diagram of a second control apparatus of a heat pump system for a vehicle according to an embodiment.

According to an embodiment of the present disclosure, a heat pump system for a vehicle may perform cooling or heating of a vehicle interior by using natural refrigerant and efficiently adjust a temperature of a battery module 5. This is achieved by using a single chiller 30 that exchanges heat between the refrigerant and a coolant, so as to comply with environmental regulations.

The refrigerant may be an R744 refrigerant formed of carbon dioxide, of which the ozone depletion potential (ODP) is 0 and the global warming potential (GWP) is 1.

In other words, by applying the R744 refrigerant that is a natural refrigerant using carbon dioxide, a heat pump system for a vehicle according to an embodiment may maximize cooling and heating performance, by being operated in a super-critical cycle. The super-critical cycle is a state in which the pressure and temperature of the refrigerant are higher than the threshold pressure and temperature.

For such a purpose, the heat pump system according to an embodiment may include an air conditioner unit and the chiller 30.

Referring to FIG. 1, the air conditioner unit includes a second heat-exchanger 14, a third heat-exchanger 15, a fourth heat-exchanger 17, and a compressor 18, which are connected through a refrigerant line 11 so as to circulate the refrigerant through a refrigerant line 11.

A first heat-exchanger 13 may be connected to the refrigerant line 11 through a first connection line 21. The first heat-exchanger 13 may heat-exchange the refrigerant selectively supplied from the compressor 18 with air.

In other words, the first heat-exchanger 13 may be provided in the first connection line 21.

A first end of the first connection line 21 may be connected to a first control apparatus 42 provided in the refrigerant line 11 between the compressor 18 and the second heat-exchanger 14.

A second end of the first connection line 21 may be connected to the refrigerant line 11 between a second control apparatus 44 and the fourth heat-exchanger 17.

In other words, the first heat-exchanger 13 is connected to the first control apparatus 42 through the first connection line 21.

The first control apparatus 42 may be provided in the refrigerant line 11, downstream of the compressor 18.

As shown in FIG. 2, the first control apparatus 42 may include a first valve 42a and a second valve 42b.

First, the first valve 42a is provided in the refrigerant line 11 between the compressor 18 and the second heat-exchanger 14.

In addition, the second valve 42b may be provided in the first connection line 21 between the compressor 18 and the first heat-exchanger 13.

The first end of the first connection line 21 is connected to the refrigerant line 11 between the compressor 18 and the first valve 42a.

The first valve 42a and the second valve 42b configured as such may be a 2-way valve that controls the opening and closing of the refrigerant line 11 and the first connection line 21.

In other words, the first control apparatus 42 is provided in the refrigerant line 11 between the compressor 18 and the second heat-exchanger 14.

Figure 5:
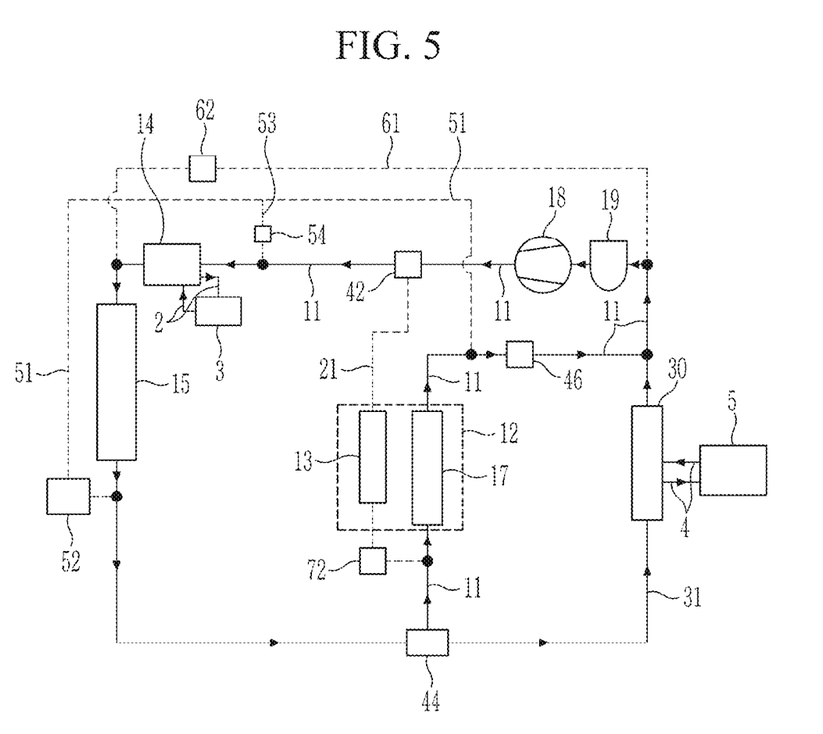
FIG. 5 is an operation diagram for cooling a battery module in a cooling mode of a vehicle interior, in a heat pump system for a vehicle according to an embodiment.

In the cooling mode of the vehicle interior, the first control apparatus 42 may flow, the refrigerant supplied from the compressor 18 to the second heat-exchanger 14 (see FIG. 5).

Figure 6:
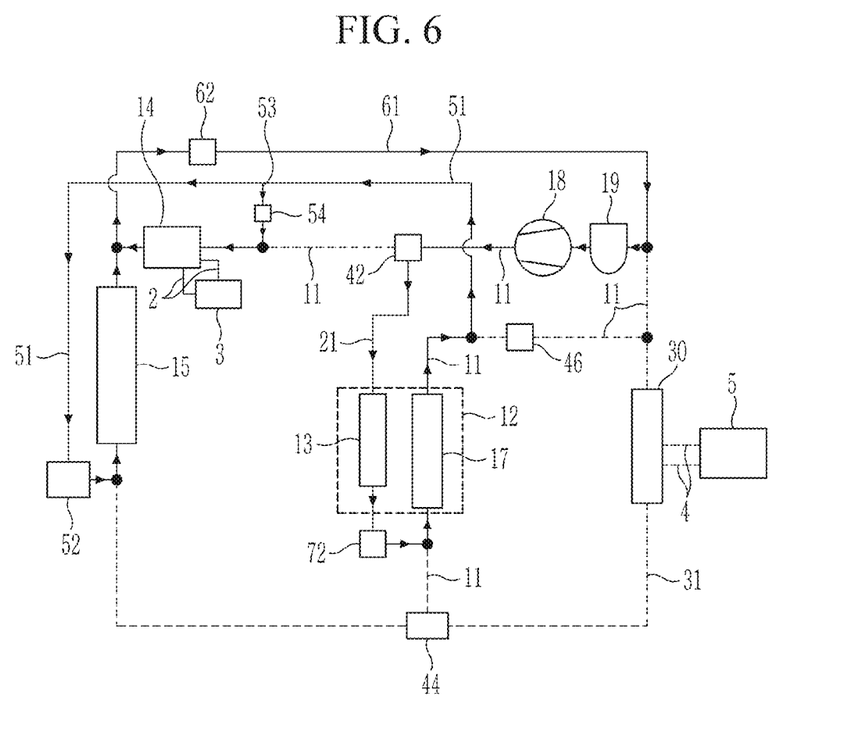
FIG. 6 is an operation diagram according to a heating mode of a vehicle interior, in a heat pump system for a vehicle according to an embodiment.

On the other hand, in the heating mode of the vehicle interior, the first control apparatus 42 may supply the refrigerant introduced through the refrigerant line 11 to the first heat-exchanger 13 through the first connection line 21 (see FIG. 6).

In the present embodiment, the first control apparatus 42 is configured with two 2-way valves, but it is not limited thereto, and a first control apparatus 42 according to another embodiment is described with reference to FIG. 3.

Referring to FIG. 3, the first control apparatus 42 according to another embodiment may include a control valve 142 provided in a portion where the refrigerant line 11 and the first connection line 21 are connected.

The control valve 142 may selectively connect the refrigerant line 11 and the first connection line 21, and at the same time, may control the flow direction and flow amount of the refrigerant.

In other words, the first control apparatus 42 according to another embodiment is applied with the control valve 142 configured with a 3-way valve, and may not only reduce the number of valves but also perform the same operation as the above-mentioned embodiment.

In the present embodiment, the second heat-exchanger 14 may be connected to the compressor 18 through the refrigerant line 11. Accordingly, the refrigerant supplied to the refrigerant line 11 may pass through the second heat-exchanger 14.

The second heat-exchanger 14 may be connected to an electrical component 3 through a first line 2 through which the coolant circulates.

The electrical component 3 may include a power conversion device such as an electric power control unit (EPCU), a motor, an inverter, an on-board charger (OBC), an autonomous driving controller, or the like.

The electrical component 3 configured as such may be water-cooled by being connected to the first line 2.

In the present embodiment, the third heat-exchanger 15 may be connected to the second heat-exchanger 14 through the refrigerant line 11. The third heat-exchanger 15 is disposed in a frontal side of the vehicle, and may cool or evaporate the refrigerant through heat-exchange with the air introduced from the outside when the vehicle is running.

Since the R744 refrigerant is a super-critical refrigerant and unlike typical refrigerants, undergoes no phase-change, it is described as a gas cooling refrigerant rather than a condensing refrigerant.

In addition, the second heat-exchanger 14 may cool or evaporate the refrigerant through heat-exchange with the coolant supplied through the first line 2. The second heat-exchanger 14 may be a water-cooled gas cooler that heat-exchanges the interiorly introduced refrigerant with the coolant.

In the present embodiment, the fourth heat-exchanger 17 may be provided in the refrigerant line 11, between the third heat-exchanger 15 and the compressor 18.

The first heat-exchanger 13 and the fourth heat-exchanger 17 may be provided inside a HVAC module (heating, ventilation, and air conditioning module) 12.

In other words, the first heat-exchanger 13, the third heat-exchanger 15, and the fourth heat-exchanger 17 may be an air-cooled gas cooler that heat-exchanges the interiorly introduced refrigerant with the air.

In the present embodiment, an accumulator 19 may be provided in the refrigerant line 11 between the fourth heat-exchanger 17 and the compressor 18.

The accumulator 19 only supplies gaseous refrigerant to the compressor 18, thereby improving efficiency and durability of the compressor 18.

In addition, although not shown in the drawings, an inner heat-exchanger may be provided inside the accumulator 19.

The inner heat-exchanger may heat-exchange the refrigerant cooled in the third heat-exchanger 15 with the low-temperature refrigerant discharged from the fourth heat-exchanger 17, and may supply the heat-exchanged refrigerant to the compressor 18 and the fourth heat-exchanger 17, respectively.

In the present embodiment, the chiller 30 may be connected to the battery module 5 through a second line 4 through which the coolant circulates. Accordingly, the coolant may be selectively circulated through the chiller 30.

The chiller 30 is connected to the refrigerant line 11 through a second connection line 31. In other words, the chiller 30 may be a water-cooled gas cooler that heat-exchanges the interiorly introduced refrigerant with the coolant.

A first end of the second connection line 31 may be connected to the second control apparatus 44. A second end of the second connection line 31 may be connected to the refrigerant line 11 between the heat-exchanger 17 and the accumulator 19.

The second control apparatus 44 may be provided at a position where the refrigerant line 11 and the second connection line 31 are connected upstream of the fourth heat-exchanger 17 and of the chiller 30.

The upstream of the fourth heat-exchanger 17, the downstream of the fourth heat-exchanger 17, the upstream of the chiller 30, and the downstream of the chiller 30 may be set based on the flow direction of the refrigerant.

In other words, based on the direction in which the refrigerant flows along the refrigerant line 11, the position at which the refrigerant is introduced into the fourth heat-exchanger 17 may be defined as the upstream of the fourth heat-exchanger 17, and the position at which the refrigerant is discharged from the fourth heat-exchanger 17 may be defined as the downstream of the fourth heat-exchanger 17.

In addition, based on the direction in which the refrigerant flows along the second connection line 31, the position at which the refrigerant is introduced into the chiller 30 may be defined as the upstream of the chiller 30, and the position at which the refrigerant is discharged from the chiller 30 may be defined as the downstream of the chiller 30.

As shown in FIG. 4, the second control apparatus 44 may include a first expansion valve 44a and a second expansion valve 44b.

First, the first expansion valve 44a is provided in the refrigerant line 11 upstream of the fourth heat-exchanger 17. In addition, the second expansion valve 44b is provided upstream of the chiller 30, in the second connection line 31.

The second control apparatus 44 configured as such may selectively expand the refrigerant introduced through the refrigerant line 11.

In addition, the second control apparatus 44 may supply the refrigerant to one or all of the fourth heat-exchanger 17 and the chiller 30 through the refrigerant line 11 and the second connection line 31.

In other words, the second control apparatus 44 may selectively expand the refrigerant while controlling the flow of the refrigerant.

Accordingly, the chiller 30 may heat-exchange the coolant selectively introduced through the second line 4 with the refrigerant selectively supplied from the air conditioner unit. As a result, the chiller 30 may adjust the temperature of the coolant.

The coolant heat-exchanged in the chiller 30 may circulate the battery module 5 through the second line 4.

A water pump (not shown) may be provided in the first line 2 and the second line 4.

In other words, the coolant may circulate the first line 2 and the second line 4 according to an operation of each water pump (not shown).

Accordingly, the coolant heat-exchanged with the refrigerant at the second heat-exchanger 14 and the chiller 30 may adjust the temperatures of the electrical component 3 and the battery module 5 by being selectively supplied to the electrical component 3 and the battery module 5.

Depending on the cooling mode or heating mode of the vehicle interior, the second control apparatus 44 may selectively expand the refrigerant, and flow the expanded refrigerant to the chiller 30 through the second connection line 31.

In addition, the second control apparatus 44 may supply the introduced refrigerant to the chiller 30 without expansion through the second connection line 31, or close the second connection line 31 such that the refrigerant may not be supplied to the chiller 30.

In more detail, when the battery module 5 is cooled by using the coolant having heat-exchanged with the refrigerant in the chiller 30, the second control apparatus 44 may open the second connection line 31. At the same time, the second control apparatus 44 expands the introduced refrigerant. The expanded refrigerant may flow to the chiller 30 through the second connection line 31.

In other words, the second control apparatus 44 may expand the refrigerant discharged from the third heat-exchanger 15 to decrease its temperature and flow the expanded refrigerant to the chiller 30, thereby further decreasing the temperature of the coolant passing through the interior of the chiller 30.

Accordingly, the battery module 5 may be cooled more efficiently, by flowing the coolant cooled while passing through the chiller 30.

In the present embodiment, the air conditioner unit may further include a third control apparatus 46, a third connection line 51, a fourth control apparatus 52, a branch line 53, a fifth control apparatus 54, a fourth connection line 61, a sixth control apparatus 62, and a seventh control apparatus 72.

First, the third control apparatus 46 may be provided in the refrigerant line 11, between the fourth heat-exchanger 17 and the compressor 18.

In the present embodiment, a first end of the third connection line 51 is connected to the refrigerant line 11 between the fourth heat-exchanger 17 and the third control apparatus 46. A second end of the third connection line 51 may be connected to the refrigerant line 11 between the third heat-exchanger 15 and the second control apparatus 44.

In addition, the fourth control apparatus 52 may be provided in the third connection line 51.

In the heating mode of the vehicle interior, referring to FIG. 6, the fourth control apparatus 52 may expand the refrigerant introduced through the third connection line 51 and supply the expanded refrigerant to the third heat-exchanger 15.

In other words, the third heat-exchanger 15 may cool or evaporate the introduced refrigerant according to the selective operation of the fourth control apparatus 52.

In the present embodiment, a first end of the branch line 53 is connected to the refrigerant line 11 between the first control apparatus 42 and the second heat-exchanger 14. In addition, a second end of the branch line 53 may be connected to the third connection line 51.

The fifth control apparatus 54 is provided in the branch line 53. The fifth control apparatus 54 may operate such that some refrigerant among the refrigerant introduced into the third connection line 51 may be introduced into the second heat-exchanger 14.

In addition, the fifth control apparatus 54 may prevent the refrigerant flowing along the refrigerant line 11 from flowing back to the third connection line 51 through the branch line 53.

In other words, the branch line 53 may be opened by an operation of the fifth control apparatus 54 such that some refrigerant among the refrigerant introduced into the third connection line 51 may be supplied to the second heat-exchanger 14.

Accordingly, some refrigerant among the refrigerant introduced into the third connection line 51 is introduced into the second heat-exchanger 14 through the branch line 53, and a remaining refrigerant may be introduced into the third heat-exchanger 15.

In the heating mode of the vehicle interior, referring to FIG. 6, the fifth control apparatus 54 may expand the refrigerant introduced through the branch line 53 and supply the expanded refrigerant to the second heat-exchanger 14.

Accordingly, in the heating mode of the vehicle interior, referring to FIG. 6, the second heat-exchanger 14 may evaporate the refrigerant through heat-exchange with the coolant supplied through the first line 2.

In other words, the second heat-exchanger 14 may cool or evaporate the introduced refrigerant through heat-exchange with the coolant supplied through the second line 2, according to selective operation of the fifth control apparatus 54.

In the present embodiment, a first end of the fourth connection line 61 is connected to the refrigerant line 11 between the second heat-exchanger 14 and the third heat-exchanger 15. In addition, a second end of the fourth connection line 61 may be connected to the refrigerant line 11 between the third control apparatus 46 and the compressor 18.

The sixth control apparatus 62 may be provided in the fourth connection line 61. The sixth control apparatus 62 may selectively open and close the fourth connection line 61.

In more detail, in the cooling mode of the vehicle interior, referring to FIG. 5, the sixth control apparatus 62 may close the fourth connection line 61. To the contrary, in the heating mode of the vehicle interior, referring to FIG. 6, the sixth control apparatus 62 may open the fourth connection line 61.

In other words, the fourth connection line 61 may directly introduce the refrigerant discharged from the second and third heat-exchangers 14 and 15 to the accumulator 19 through an operation of the sixth control apparatus 62, selectively.

In addition, the seventh control apparatus 72 may be provided in the first connection line 21. In the cooling mode of the vehicle interior, referring to FIG. 5, the seventh control apparatus 72 may operate together with the first control apparatus 42 to close the first connection line 21.

On the other hand, in the heating mode of the vehicle interior, as illustrated in FIG. 6, the seventh control apparatus 72 may operate together with the first control apparatus 42 to open the first connection line 21. At this time, the seventh control apparatus 72 may supply the refrigerant introduced through the first connection line 21 to the fourth heat-exchanger 17 in an unexpanded state.

Referring to FIG. 6, when dehumidification is required in the heating mode of the vehicle interior, the seventh control apparatus 72 may expand the refrigerant introduced through the first connection line 21 and supply the expanded refrigerant to the fourth heat-exchanger 17.

The third control apparatus 46 and the sixth control apparatus 62 may be 2-way valves.

In addition, the fourth control apparatus 52, the fifth control apparatus 54, and the seventh control apparatus 72 may be expansion valves.

In the heat pump system configured as such, the second heat-exchanger 14 may cool or evaporate the introduced refrigerant according to the selective operation of the fifth control apparatus 54.

The third heat-exchanger 15 may cool or evaporate the introduced refrigerant according to the selective operation of the fourth control apparatus 52.

In addition, the fourth heat-exchanger 17 may cool or evaporate the introduced refrigerant according to the selective operation of the second control apparatus 44 or the seventh control apparatus 72.

In other words, the second heat-exchanger 14, the third heat-exchanger 15, and the fourth heat-exchanger 17 may evaporate the refrigerant when the expanded refrigerant is introduced, and cool the refrigerant when the unexpanded refrigerant is introduced.

Hereinafter, operation and action of a heat pump system of a vehicle according to an embodiment configured as described above is described in detail with reference to FIGS. 5 and 6.

First, in the cooling mode of the vehicle interior, the operation for cooling the battery module 5 is described with reference to FIG. 5.

FIG. 5 is an operation diagram for cooling a battery module in a cooling mode of the vehicle interior, in a heat pump system for a vehicle according to an embodiment.

Referring to FIG. 5, the coolant may circulate through the first line 2 by an operation of a water pump (not shown).

Accordingly, the coolant having passed through the electrical component 3 may be supplied to the second heat-exchanger 14 along the first line 2.

Respective components in the air conditioner unit operate for cooling of the vehicle interior. Accordingly, the refrigerant is circulated along the refrigerant line 11.

The refrigerant line 11 connecting the fourth heat-exchanger 17 and the compressor 18 is opened by an operation of the third control apparatus 46.

The refrigerant line 11 connecting the compressor 18 and the second heat-exchanger 14 is opened by an operation of the first control apparatus 42.

Simultaneously, the first connection line 21 is closed by the operation of the first control apparatus 42 and the seventh control apparatus 72.

In addition, the third connection line 51 is closed by the operation of the fourth control apparatus 52. The branch line 53 is closed by the operation of the fifth control apparatus 54.

In addition, the fourth connection line 61 is closed by the operation of the sixth control apparatus 62.

The second connection line 31 is opened by the operation of the second control apparatus 44, for cooling of the battery module 5.

At this time, the coolant may circulate through the second line 4 by the operation of a water pump (not shown). Accordingly, the coolant having passed through the battery module 5 may be supplied to the chiller 30 along the second line 4.

The second control apparatus 44 may expand the refrigerant for cooling the battery module 5 by using the coolant having heat-exchanged with the refrigerant in the chiller 30, and may flow the expanded refrigerant to the second connection line 31. The expanded refrigerant may be introduced into the chiller 30 along the second connection line 31.

Therefore, the coolant having passed through the chiller 30 may be cooled through heat-exchange with the expanded refrigerant supplied to the chiller 30.

In other words, the coolant passing through the chiller 30 is cooled through heat-exchange with the expanded refrigerant supplied to the chiller 30. The coolant cooled in the chiller 30 is supplied to the battery module 5 along the second line 4. Accordingly, the battery module 5 may be efficiently cooled by the coolant cooled at the chiller 30.

The refrigerant supplied from the compressor 18 may sequentially pass through the second heat-exchanger 14 and the third heat-exchanger 15 along the refrigerant line 11.

The second heat-exchanger 14 may primarily cool the refrigerant by using the coolant flowing along the first line 2. In addition, the third heat-exchanger 15 may secondarily cool the refrigerant introduced from the second heat-exchanger 14 through heat-exchange with the air.

The refrigerant having sequentially passed through the second heat-exchanger 14 and the third heat-exchanger 15 may be circulated along the refrigerant line 11 and the second connection line 31 that was opened by the second control apparatus 44.

The second control apparatus 44 may expand the refrigerant such that the expanded refrigerant may be supplied to the fourth heat-exchanger 17 and the chiller 30.

In other words, the second control apparatus 44 expands the refrigerant introduced into the second connection line 31 among the refrigerant having passed through the third heat-exchanger 15 such that the expanded refrigerant may be supplied to the chiller 30.

Therefore, the refrigerant introduced into the second connection line 31 is expanded through the operation of the second control apparatus 44 to be in the state of low-temperature and low pressure, and is introduced into the chiller 30 provided in the second connection line 31.

Then, the refrigerant introduced to the chiller 30 heat-exchanges with the coolant supplied through the second line 4, passes through the accumulator 19 through the refrigerant line 11 connected to the second connection line 31, and then is introduced into the compressor 18.

The remaining refrigerant discharged from the third heat-exchanger 15 flows through the refrigerant line 11 for cooling the vehicle interior. The remaining refrigerant 11 sequentially passes through the fourth heat-exchanger 17, the accumulator 19, and the compressor 18.

Air introduced into the HVAC module 12 is cooled by the refrigerant in the low-temperature state introduced into the fourth heat-exchanger 17 while passing through the fourth heat-exchanger 17.

The cooled air may cool the vehicle interior by passing through the first heat-exchanger 13 that is not supplied with the refrigerant and being directly introduced into the vehicle interior.

The refrigerant having an increased cooled level while sequentially passing through the second heat-exchanger 14 and the third heat-exchanger 15 is expanded and supplied to the fourth heat-exchanger 17. As a result, the refrigerant may be evaporated at a lower temperature.

In other words, in the present embodiment, the second heat-exchanger 14 cools the refrigerant through heat-exchange with the coolant, and the third heat-exchanger 15 cools the refrigerant through heat-exchange with air. As a result, the R744 refrigerant formed of carbon dioxide may be more efficiently cooled, and thereby providing an advantage to the formation of sub-cooling of the refrigerant.

In addition, as the refrigerant formed with sub-cooling is evaporated at a lower temperature at the fourth heat-exchanger 17, the temperature of the air passing through the fourth heat-exchanger 17 may be further decreased, thereby improving the cooling performance and efficiency.

While repeatedly performing the above-described processes, the refrigerant may cool the vehicle interior in the cooling mode of the vehicle interior and at the same time, cool the coolant through heat-exchange while passing through the chiller 30.

The low-temperature coolant cooled at the chiller 30 flows to the battery module 5 through the second line 4. Accordingly, the battery module 5 may be efficiently cooled by the supplied low-temperature coolant.

In the present embodiment, the operation in the heating mode of the vehicle interior is described with reference to FIG. 6.

FIG. 6 is an operation diagram of a heat pump system for a vehicle according to an embodiment according to a heating mode of the vehicle interior.

Referring to FIG. 6, the coolant may circulate through the first line 2 by the operation of a water pump (not shown).

Accordingly, the coolant having passed through the electrical component 3 may be supplied to the second heat-exchanger 14 along the first line 2.

Respective components in the air conditioner unit operate for heating the vehicle interior. Accordingly, the refrigerant is circulated along the refrigerant line 11.

The refrigerant line 11 connecting the third heat-exchanger 15 and the fourth heat-exchanger 17 is closed by the operation of the second control apparatus 44.

Simultaneously, the second connection line 31 may be closed by the operation of the second control apparatus 44.

A portion of the refrigerant line 11 connecting the compressor 18 and the third control apparatus 46 is closed by the operation of the third control apparatus 46.

In addition, a portion of the refrigerant line 11 connecting the first control apparatus 42 and the second heat-exchanger 14 may be closed by the operation of the first control apparatus 42.

Simultaneously, the first connection line 21 is opened by the operation of the first control apparatus 42.

The first connection line 21 may be connected to the refrigerant line 11 upstream of the fourth heat-exchanger 17 by the operation of the seventh control apparatus 72.

The seventh control apparatus 72 may supply the refrigerant introduced through the first connection line 21 after passing through the first heat-exchanger 13, to the fourth heat-exchanger 17 in an unexpanded state.

Accordingly, the fourth heat-exchanger 17 may cool the refrigerant by using the air introduced into the HVAC module 12.

The third connection line 51 is opened by the operation of the fourth control apparatus 52. The branch line 53 may be opened by the operation of the fifth control apparatus 54.

Simultaneously, a portion of the refrigerant line 11 connecting the branch line 53 and the second heat-exchanger 14 may be opened.

Accordingly, the refrigerant having passed through the fourth heat-exchanger 17 is introduced into the opened third connection line 51.

Some refrigerant among the refrigerant introduced into the third connection line 51 flows to the second heat-exchanger 14 through the opened branch line 53.

In addition, a remaining refrigerant among the refrigerant introduced into the third connection line 51 may be introduced into the third heat-exchanger 15 through the third connection line 51 and the opened refrigerant line 11, respectively.

The fourth control apparatus 52 may expand the refrigerant such that the expanded refrigerant may be supplied to the third heat-exchanger 15. In addition, the fifth control apparatus 54 may expand the refrigerant such that the expanded refrigerant may be supplied to the second heat-exchanger 14.

Accordingly, the second heat-exchanger 14 may evaporate the expanded refrigerant through heat-exchange with the coolant supplied through the first line 2. At this time, the second heat-exchanger 14 may recollect the waste heat of the electrical component 2. This is achieved by recollecting the waste heat from the heated coolant emanating from the electrical component 3.

In addition, the third heat-exchanger 15 may recollect the ambient air heat while evaporating the expanded refrigerant through heat-exchange with the air.

In the present embodiment, the fourth connection line 61 is opened by the operation of the sixth control apparatus 62.

Accordingly, the refrigerant discharged from the second heat-exchanger 14 and the third heat-exchanger 15 may be supplied to the compressor 18 along the opened fourth connection line 61.

In such a state, the refrigerant supplied from the compressor 18 is introduced into the first heat-exchanger 13 along the first connection line 21 connected to the refrigerant line 11. The refrigerant having passed through the first heat-exchanger 13 is introduced into the fourth heat-exchanger 17 along the refrigerant line 11 connected to the first connection line 21.

The first heat-exchanger 13 and the fourth heat-exchanger 17 may cool the refrigerant by heat-exchanging the air introduced into the HVAC module 12 with the refrigerant. The refrigerant primarily cooled at the first heat-exchanger 13 may be further cooled at the fourth heat-exchanger 17.

In other words, when the refrigerant having passed through the first heat-exchanger 13 is supplied to the fourth heat-exchanger 17 in an unexpanded state by the operation of the seventh control apparatus 72, the fourth heat-exchanger 17 may cool the refrigerant by heat-exchanging the air introduced into the HVAC module 12 with the refrigerant.

The refrigerant having passed through the fourth heat-exchanger 17 flows along the opened third connection line 51. Some refrigerant among the refrigerant introduced into the third connection line 51 flows to the fifth control apparatus 54 through the opened branch line 53.

In addition, a remaining refrigerant among the refrigerant introduced into the third connection line 51 may be introduced to the fourth control apparatus 52 along the third connection line 51.

The fourth control apparatus 52 may expand the refrigerant and supply the expanded refrigerant to the third heat-exchanger 15. In addition, the fifth control apparatus 54 may expand the refrigerant and supply the expanded refrigerant to the second heat-exchanger 14.

In other words, the refrigerant introduced into the third connection line 51 is branched through the branch line 53, and supplied to each of the second heat-exchanger 14 and the third heat-exchanger 15.

Accordingly, the second heat-exchanger 14 may cool the supplied refrigerant through heat-exchange with the coolant, and at the same time, the third heat-exchanger 15 may cool the supplied refrigerant through heat-exchange with the air. While repeatedly performing such an operation, the second heat-exchanger 14 and the third heat-exchanger 15 may recollect the waste heat of the electrical component 3 and the heat emanating from ambient air.

In other words, since the recollected waste heat of the electrical component 3 and ambient air heat is used for increasing the temperature of the refrigerant, the heat pump system may reduce the power consumption of the compressor 18 and improve the heating efficiency.

The refrigerant discharged from the second heat-exchanger 14 and the third heat-exchanger 15 is supplied to the accumulator 19 along the opened fourth connection line 61.

The refrigerant having passed through the accumulator 19 may be supplied to the compressor 18.

In addition, the refrigerant compressed by the compressor 18 to the high-temperature and pressure state is introduced back into the first heat-exchanger 13 along the first connection line 21.

As described above, the refrigerant supplied to the first heat-exchanger 13 and the fourth heat-exchanger 17 may increase the temperature of the air introduced into the HVAC module 12.

Accordingly, the air introduced from the outside may be converted to a high-temperature state while sequentially passing through the fourth heat-exchanger 17 and the first heat-exchanger 13, and flow into the vehicle interior, thereby achieving the heating of the vehicle interior.

When dehumidification is required while the heating mode of the vehicle interior is being operated, the seventh control apparatus 72 may expand the refrigerant having passed through the first heat-exchanger 13 and supply the expanded refrigerant to the fourth heat-exchanger 17.

Then, air introduced into the HVAC module 12 is dehumidified by the refrigerant in the low-temperature state introduced into the fourth heat-exchanger 17 while passing through the fourth heat-exchanger 17. Thereafter, since the air is converted to a high-temperature state while passing through the first heat-exchanger 13 and then introduced into the vehicle interior, the vehicle interior may be smoothly heated and dehumidified.

Therefore, as described above, when a heat pump system for a vehicle according to an embodiment is applied, since cooling or heating of a vehicle interior is performed by using natural refrigerant, it is possible to respond to environmental regulations and improve the overall marketability of the vehicle.

In addition, according to the disclosure, by applying the R744 refrigerant, that is a natural refrigerant using carbon dioxide, cooling and heating performance may be maximized by being operated in a super-critical region. The super-critical region is a state in which the pressure and temperature of the refrigerant are higher than the threshold pressure and temperature, for cooling and heating of the vehicle interior.

In addition, according to the disclosure, the temperature of the battery module 5 is efficiently adjusted by using a single chiller 30 heat-exchanging the coolant and refrigerant depending on the vehicle mode, and thereby streamlining and simplification of the system may be achieved.

In addition, according to an embodiment, by efficiently adjusting the temperature of the battery module 5, the optimal performance of the battery module 5 may be enabled, and the overall travel distance of the vehicle may be increased due to the efficient management of the battery module 5.

In addition, in the heating mode of the vehicle interior, according to the disclosure, since the refrigerant is branched through the branch line 53 and expanded to be supplied to the second and third heat-exchangers 14 and 15, it becomes easy to control the flow of the refrigerant, smoothly recollect the ambient air heat and waste heat of the electrical component 3, and at the same time, optimally design the chiller 30 for cooling of the battery module 5.

In addition, according to an embodiment, it is possible to reduce manufacturing cost and weight through simplification of an entire system, and to improve space utilization.

While this disclosure has been described in connection with what is presently considered to be practical embodiments, it should be understood that the disclosure is not limited to the disclosed embodiments. On the contrary, it is intended to cover various modifications and equivalent arrangements included within the spirit and scope of the appended claims.

DESCRIPTION OF SYMBOLS 2, 4: first and second lines
3: electrical component
5: battery module
11: refrigerant line
12: HVAC module
13, 14, 15, 17: first, second, third, and fourth heat-exchangers
18: compressor
19: accumulator
21: first connection line
30: chiller
31: second connection line
42: first control apparatus
44: second control apparatus
46: third control apparatus
51: third connection line
52: fourth control apparatus
53: branch line
54: fifth control apparatus
61: fourth connection line
62: sixth control apparatus
72: seventh control apparatus

What is claimed is:

1. A heat pump system for a vehicle, comprising:
an air conditioner unit comprising a compressor, a second heat-exchanger, a third heat-exchanger, and a fourth heat-exchanger that are connected through a refrigerant line so as to circulate refrigerant through a refrigerant line; and
a chiller connected to the refrigerant line through a second connection line, and configured to exchange heat between the refrigerant supplied from the air conditioner unit and a coolant to adjust a temperature of the coolant,
wherein the air conditioner unit further comprises:
a first control apparatus provided in the refrigerant line downstream of the compressor;
a first heat-exchanger connected to the first control apparatus through a first connection line;
a second control apparatus provided at a position where the refrigerant line and the second connection line are connected upstream of the chiller and the fourth heat-exchanger;
a third control apparatus provided in the refrigerant line between the fourth heat-exchanger and the compressor;
a third connection line including: a first end connected to the refrigerant line between the fourth heat-exchanger and the third control apparatus, and a second end connected to the refrigerant line between the third heat-exchanger and the second control apparatus; and
a fourth control apparatus provided in the third connection line.

2. The heat pump system of claim 1, wherein the first control apparatus comprises:
a first valve provided in the refrigerant line between the compressor and the second heat-exchanger; and
a second valve provided in the first connection line between the compressor and the first heat-exchanger.

3. The heat pump system of claim 2, wherein the first valve and the second valve are 2-way valves.

4. The heat pump system of claim 1, wherein the first control apparatus comprises:
a single control valve provided in a portion where the refrigerant line and the first connection line are connected.

5. The heat pump system of claim 1, wherein the second control apparatus comprises:
a first expansion valve provided in the refrigerant line upstream of the fourth heat-exchanger; and
a second expansion valve provided in the second connection line upstream of the chiller.

6. The heat pump system of claim 1, wherein the air conditioner unit further comprises:
a branch line including: a first end connected to the refrigerant line between the first control apparatus and the second heat-exchanger, and a second end connected to the third connection line;
a fifth control apparatus provided in the branch line;
a fourth connection line including: a first end connected to the refrigerant line between the second heat-exchanger and the third heat-exchanger, and a second end connected to the refrigerant line between the third control apparatus and the compressor;
a sixth control apparatus provided in the fourth connection line; and
a seventh control apparatus provided in the first connection line.

7. The heat pump system of claim 6, wherein the third control apparatus and the sixth control apparatus are 2-way valves.

8. The heat pump system of claim 6, wherein the fourth control apparatus, the fifth control apparatus, and the seventh control apparatus are expansion valves.

9. The heat pump system of claim 6, wherein, in a cooling mode of the vehicle interior:
the refrigerant line connecting the fourth heat-exchanger and the compressor is opened by an operation of the third control apparatus;
the refrigerant line connecting the compressor and the second heat-exchanger is opened by an operation of the first control apparatus;
the first connection line is closed by the operation of the first control apparatus and the seventh control apparatus;
the third connection line is closed by an operation of the fourth control apparatus;
the branch line is closed by an operation of the fifth control apparatus; and
the fourth connection line is closed by an operation of the sixth control apparatus.

10. The heat pump system of claim 9, wherein, in the cooling mode of the vehicle interior, when cooling of a battery module is required,
the second connection line is opened by an operation of the second control apparatus.

11. The heat pump system of claim 10, wherein the second control apparatus is configured to expand the refrigerant introduced into the second connection line and flow the expanded refrigerant to the chiller such that the battery module may be cooled by using the coolant to exchange heat with the refrigerant in the chiller.

12. The heat pump system of claim 6, wherein, in a heating mode of the vehicle interior:
the refrigerant line connecting the third heat-exchanger and the fourth heat-exchanger is closed by an operation of the second control apparatus;
a portion of the refrigerant line connecting the compressor and the third control apparatus is closed by an operation of the third control apparatus;
a portion of the refrigerant line connecting the first control apparatus and the second heat-exchanger is closed by an operation of the first control apparatus;
the first connection line is opened by the operation of the first control apparatus;
the first connection line is connected to the refrigerant line upstream of the fourth heat-exchanger by an operation of the seventh control apparatus;
the second connection line is closed by the operation of the second control apparatus;
the third connection line is opened by an operation of the fourth control apparatus;
the branch line is opened by an operation of the fifth control apparatus; and
the fourth connection line is opened by an operation of the sixth control apparatus.

13. The heat pump system of claim 12, wherein:
the fourth control apparatus is configured to expand the refrigerant such that the expanded refrigerant is supplied to the third heat-exchanger; and
the fifth control apparatus is configured to expand the refrigerant such that the expanded refrigerant is supplied to the second heat-exchanger.

14. The heat pump system of claim 12, wherein:
a portion of the refrigerant among the refrigerant introduced from the fourth heat-exchanger into the third connection line is introduced into the second heat-exchanger through the branch line; and
a remaining refrigerant is introduced into the third heat-exchanger.

15. The heat pump system of claim 12, wherein the refrigerant discharged from the second heat-exchanger and the third heat-exchanger is supplied to the compressor along the fourth connection line.

16. The heat pump system of claim 12, wherein the seventh control apparatus is configured to supply the refrigerant introduced through the first connection line to the fourth heat-exchanger in an unexpanded state.

17. The heat pump system of claim 12, wherein, in the heating mode of the vehicle interior, when dehumidification is required,
the seventh control apparatus is configured to expand the refrigerant introduced through the first connection line and supply the expanded refrigerant to the fourth heat-exchanger.

18. The heat pump system of claim 6, wherein the second heat-exchanger, the third heat-exchanger, and the fourth heat-exchanger are configured to cool or evaporate the refrigerant according to selective operations of the second control apparatus, the fourth control apparatus, the fifth control apparatus, and the seventh control apparatus each.

19. The heat pump system of claim 1, wherein the refrigerant is R744 refrigerant formed of carbon dioxide.

20. The heat pump system of claim 1, wherein an accumulator is provided in the refrigerant line, between the fourth heat-exchanger and the compressor.

21. The heat pump system of claim 1, wherein:
the second heat-exchanger is connected to an electrical component through a first line through which the coolant circulates; and
the chiller is connected to a battery module through a second line through which the coolant circulates.

22. The heat pump system of claim 1, wherein:
the first heat exchanger, the third heat-exchanger, and the fourth heat-exchanger are air-cooled gas coolers configured to exchange heat between the refrigerant and air, and
the second heat exchanger and the chiller are water-cooled gas coolers configured to exchange heat between the refrigerant and the coolant.

* * * * *